United States Patent
Du

(10) Patent No.: US 11,971,723 B2
(45) Date of Patent: Apr. 30, 2024

(54) PROCESSING METHOD AND APPARATUS FOR DRIVING SIMULATION SCENE, AND STORAGE MEDIUM

(71) Applicant: Tencent Technology (Shenzhen) Company Limited, Guangdong (CN)

(72) Inventor: Haining Du, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 426 days.

(21) Appl. No.: 17/378,432

(22) Filed: Jul. 16, 2021

(65) Prior Publication Data

US 2021/0341935 A1    Nov. 4, 2021

Related U.S. Application Data

(63) Continuation of application No. PCT/CN2020/087045, filed on Apr. 26, 2020.

(30) Foreign Application Priority Data

May 9, 2019    (CN) .......................... 201910386494.4

(51) Int. Cl.
  *G05D 1/02*    (2020.01)
  *G05B 17/02*    (2006.01)
  (Continued)

(52) U.S. Cl.
  CPC ........... *G05D 1/0221* (2013.01); *G05B 17/02* (2013.01); *G05D 1/0088* (2013.01);
  (Continued)

(58) Field of Classification Search
  CPC .......... G05D 1/02; G05D 1/00; G01M 17/007; G01M 17/06; G05B 17/02; G05B 23/02; G06F 17/50
  See application file for complete search history.

(56) References Cited

U.S. PATENT DOCUMENTS

| | | |
|---|---|---|
| 6,117,007 A | 9/2000 | Matsuyama et al. |
| 2011/0301925 A1 | 12/2011 | McWilliams, III et al. |

(Continued)

FOREIGN PATENT DOCUMENTS

| | | |
|---|---|---|
| CN | 1178352 A | 4/1998 |
| CN | 101281661 A | 10/2008 |

(Continued)

OTHER PUBLICATIONS

International Search Report and Written Opinion for priority application No. PCT/CN2020/087045, dated Jul. 29, 2020, 11p, in Chinese language.

(Continued)

*Primary Examiner* — Tan Q Nguyen
(74) *Attorney, Agent, or Firm* — Crowell & Moring LLP

(57) ABSTRACT

This disclosure provides a method, apparatus, and storage medium for processing a driving simulation scenario. The method includes: acquiring a plurality of route points in a road network model for driving simulation; determining one or more departure points and one or more destination points from the plurality of route points; generating a background vehicle at the one or more departure points; and controlling the background vehicle to travel in the road network model from the one or more departure points to a corresponding destination point of the one or more destination points, where the background vehicle is removed.

20 Claims, 8 Drawing Sheets

---

A server acquires a plurality of route terminals in a road network model for driving simulation — 101

Determine at least one first route endpoint of the plurality of route points as a departure point and at least second one route points as a destination point — 102

Generate a background vehicle at the departure point in the road network model, and control the background vehicle to travel into the road network model from the departure point and travel out of the road network model in a case that the background vehicle travels to the destination point — 103

(51) Int. Cl.
*G05D 1/00* (2006.01)
*B60W 60/00* (2020.01)
*G05B 23/02* (2006.01)

(52) U.S. Cl.
CPC ....... *B60W 60/001* (2020.02); *B60W 2552/05* (2020.02); *B60W 2552/10* (2020.02); *B60W 2555/60* (2020.02); *B60W 2720/10* (2013.01); *B60W 2720/12* (2013.01)

(56) References Cited

U.S. PATENT DOCUMENTS

| | | | |
|---|---|---|---|
| 2012/0070804 | A1 | 3/2012 | Pang et al. |
| 2016/0314224 | A1* | 10/2016 | Wei ....................... G05D 1/0088 |
| 2017/0161410 | A1* | 6/2017 | Mizuta .................... G06F 30/20 |
| 2018/0086344 | A1 | 3/2018 | Zhu et al. |
| 2019/0009789 | A1* | 1/2019 | Zhang .................. G06V 20/588 |
| 2019/0163181 | A1* | 5/2019 | Liu ......................... G06F 30/20 |

FOREIGN PATENT DOCUMENTS

| | | |
|---|---|---|
| CN | 101807224 A | 8/2010 |
| CN | 104834776 A | 8/2015 |
| CN | 105808315 A | 7/2016 |
| CN | 106777747 A | 5/2017 |
| CN | 106934107 A | 7/2017 |
| CN | 107992016 A | 5/2018 |
| CN | 108829087 A | 11/2018 |
| CN | 108931927 A | 12/2018 |
| CN | 109521748 A | 3/2019 |
| CN | 110118661 A | 8/2019 |
| DE | 10 2012 018 359 A1 | 3/2013 |
| KR | 20170091977 A | 8/2017 |
| WO | WO 2020/224462 A1 | 11/2020 |

OTHER PUBLICATIONS

English language translation of the International Search Report for priority application No. PCT/CN2020/087045, dated Jul. 29, 2020, 3p.

Search Report for Chinese Application No. 201910386494.4, dated Aug. 21, 2020, 3 p, in Chinese language.

Zheng, In-Lin, "Traffic Simulation Model of City Road Section based on Cellular Automata", Journal of Chinese People's Public Security University (Science and Technology)/China Academic Journal Electronic Publishing House, No. 4, dated Dec. 31, 2004, pp. 78-81, in Chinese language.

First Office Action and Search Report for Chinese Application No. 201910386494.4, dated Aug. 28, 2020, 7p, in Chinese language.

Second Office Action for Chinese Application No. 201910386494.4, dated May 6, 2021, 8p, in Chinese language.

Concise Explanation of Relevance of International Written Opinion for priority application No. PCT/CN2020/087045, First Office Action and Search Report for Chinese Application No. 201910386494.4, Second Office Action for Chinese Application No. 201910386494.4, and "Traffic Simulation Model of City Road Section based on Cellular Automata."

Extended European Search Report for application No. EP 20801543.8 dated May 20, 2022, 8p.

* cited by examiner

PROCESSING METHOD AND APPARATUS FOR DRIVING SIMULATION SCENE, AND STORAGE MEDIUM

RELATED APPLICATION

This application is a continuation of PCT Application No. PCT/CN2020/087045, entitled "PROCESSING METHOD AND APPARATUS FOR DRIVING SIMULATION SCENE, AND STORAGE MEDIUM" and filed on Apr. 26, 2020, which claims priority to Chinese Patent Application No. 201910386494.4, entitled "METHOD, APPARATUS, STORAGE MEDIUM FOR PROCESSING DRIVING SIMULATION SCENARIO" and filed on May 9, 2019. The above applications are incorporated herein by reference in their entireties.

TECHNICAL FIELD

This disclosure relates to autonomous driving technologies, and in particular, to a method, apparatus, storage medium for processing a driving simulation scenario.

BACKGROUND

Autonomous driving vehicles, also referred to as unmanned vehicles or computer-driven vehicles, are capable of autonomously traveling along a road in an unmanned status. Generally, before the autonomous driving vehicle is put into use, a large quantity of tests are required to check its safety and stability.

In consideration of road safety, the related art provides a driving simulation platform to construct a simulative test scenario to perform a simulative test on the autonomous driving vehicle. However, in the related art, during construction of the simulative test scenario, users need to manually add background vehicles and test vehicles. Therefore, for a large-scale simulative test scenario that requires a large quantity of background vehicles, processing efficiency is low by using the construction method.

SUMMARY

Embodiments of this disclosure provide a method, apparatus, and storage medium for processing a driving simulation scenario, which can automatically construct a driving simulation scenario for vehicle simulation and has high processing efficiency.

The technical solutions in the embodiments of this disclosure are implemented as follows.

An embodiment of this disclosure provides a method for processing a driving simulation scenario, the method including:

acquiring a plurality of route points in a road network model for driving simulation;
determining one or more departure points and one or more destination points from the plurality of route points;
generating a background vehicle; and
controlling the background vehicle to travel in the road network model from one of the one or more departure points to a corresponding destination point of the one or more destination points, where the background vehicle is removed from the simulation scenario.

An embodiment of this disclosure further provides an apparatus for processing a driving simulation scenario, the apparatus including:

an acquisition unit, configured to acquire a plurality of route points in a road network model for driving simulation;
a determination unit, configured to determine at least one first route point of the plurality of route points as a departure point and at least one second route point as a destination point; and
a generation unit, configured to generate a background vehicle; and
a control unit, configured to control the background vehicle to travel into the road network model from the departure point and travel out of the road network model in a case that the background vehicle travels to the destination point.

An embodiment of this disclosure further provides an apparatus for processing a driving simulation scenario, the apparatus including:

a memory, configured to store executable instructions; and
at least one processor, configured to, when executing the executable instructions stored in the memory, cause the apparatus to:
acquire a plurality of route points in a road network model for driving simulation;
determine one or more departure points and one or more destination points from the plurality of route points;
generate a background vehicle; and
control the background vehicle to travel in the road network model from one of the one or more departure points to a corresponding destination point of the one or more destination points, where the background vehicle is removed from the simulation scenario.

An embodiment of this disclosure provides a non-transitory storage medium storing executable instructions, the executable instructions, when executed by a processor, causing the processor to perform the foregoing method for processing a driving simulation scenario provided in the embodiments of this disclosure.

An embodiment of this disclosure provides a non-transitory storage medium storing executable instructions, the executable instructions, when executed by a processor, causing an electronic device to:

acquire a plurality of route points in a road network model for driving simulation;
determine one or more departure points and one or more destination points from the plurality of route points;
generate a background vehicle; and
control the background vehicle to travel in the road network model from one of the one or more departure points to a corresponding destination point of the one or more destination points, where the background vehicle is removed from the simulation scenario.

The embodiments of this disclosure have the following beneficial effects:

1). At least one route point is determined from the plurality of route points as the departure points and at least one route point is determined as the destination point. In this way, the positions of the departure point and the destination point in the road network model correspond to the route points, avoiding a sudden change in a traffic status and visual abruptness caused by the background vehicle being in the middle of a route.

2). The background vehicle is generated at the departure point in the road network model. In this way, automatic generation of the background vehicle is achieved during the driving simulation, and processing efficiency of the driving simulation scenario is improved.

3). The background vehicle is controlled to travel into the road network model from the departure point and travel out of the road network model in a case that the background vehicle travels to the destination point. In this way, since the drive-in and the drive-out of the background vehicle in the road network model respectively correspond to the specific departure point and destination point, generation and disappearance of the background vehicle are more proper, avoiding an abrupt display effect during the simulation.

DESCRIPTION OF EMBODIMENTS

Figure 1:
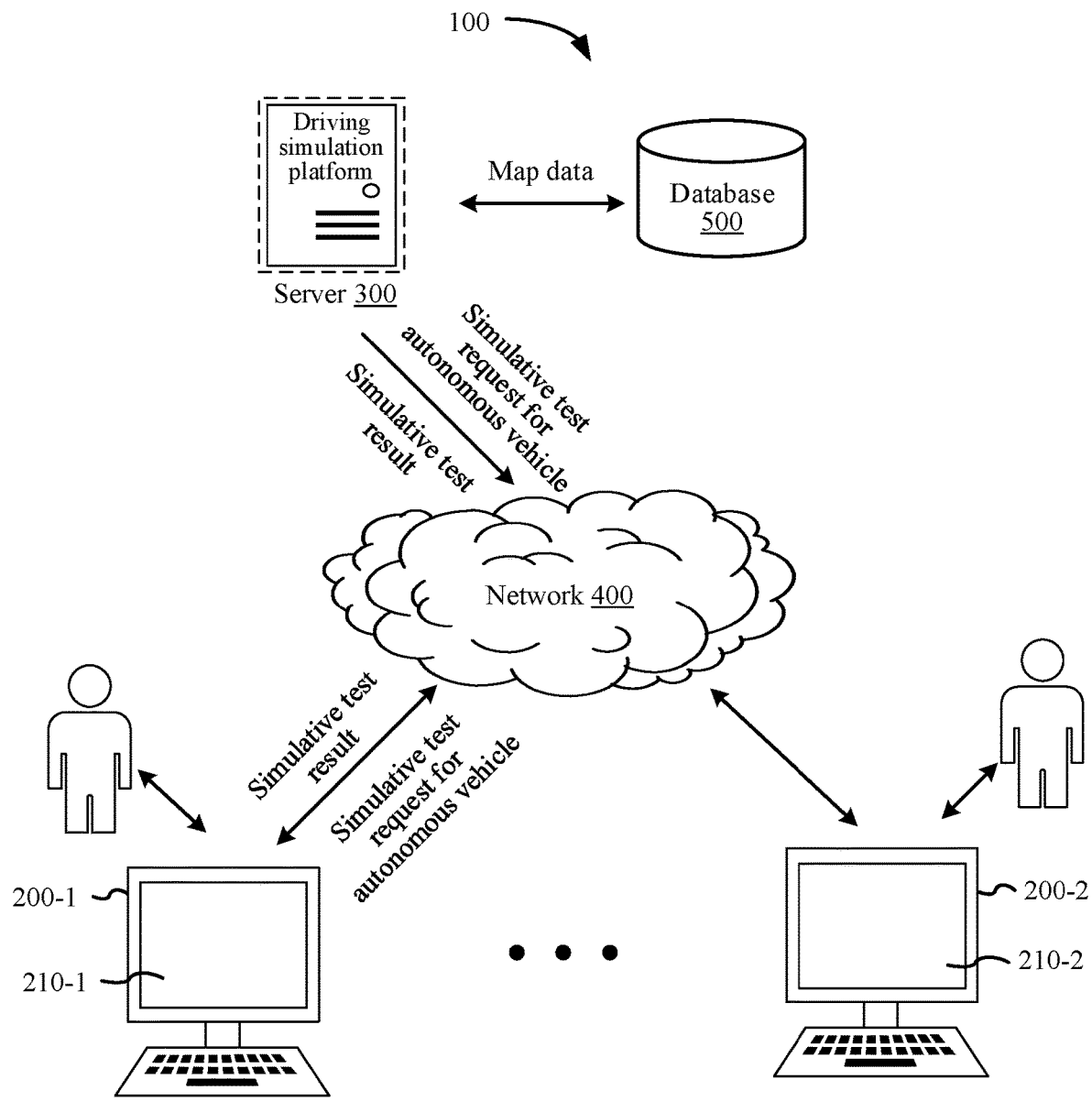
FIG. 1 is a schematic architectural diagram of a driving simulation system according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following descriptions, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this disclosure described herein can be implemented in a sequence in addition to the sequence shown or described herein.

Unless otherwise defined, meanings of all technical and scientific terms used in this specification are the same as those usually understood by a person skilled in the art to which this disclosure belongs. Terms used in this specification are merely intended to describe objectives of the embodiments of this disclosure, but are not intended to limit this disclosure.

Before the embodiments of this disclosure are further described in detail, a description is made on nouns and terms in the embodiments of this disclosure, and the nouns and terms in the embodiments of this disclosure are applicable to the following explanations.

"Autonomous driving" means being capable of providing instructions and decisions for a vehicle traveling task without a need of a physical driving operation of a test driver and performing a control behavior as the test driver to complete a safe traveling function of a vehicle.

"Test vehicle" is a vehicle configured to simulate an autonomous driving vehicle and its dynamics characteristics (such as a power, a torque, a time consumed to accelerate from 0 km/h to 100 km/h) to replace the autonomous driving vehicle during driving simulation and to test safety and stability of a traveling policy (that is, an autonomous driving algorithm) applicable to the autonomous driving vehicle.

"Background vehicle" is a vehicle conforming to a dynamics model that constitutes a driving background of a test vehicle during driving simulation of an autonomous driving vehicle, which is configured to trigger reaction of the test vehicle such as following, overtaking, and stopping.

"Road network model" is a graphical mathematical model for traveling of test vehicles and background vehicles that is obtained by means of three-dimensional or two-dimensional modeling based on map data, which may be data of maps of different levels of the real world (a city map, an urban area map, and the like) or map data of a customized virtual world.

"Route plan" means calculating a smooth route from a current position to a target position based on a current status of a vehicle (including a position, a speed, and an acceleration), a current driving scenario (different dimensional characteristics of an environment in which the vehicle is located, such as a degree of congestion on a road, whether a traveling position corresponds to a signal light (or traffic signal light) position/route intersection position, and the like), and a target status of the vehicle (including a target position, a speed, and an acceleration).

"Speed plan" means calculating a speed of each route point on a basis of a route obtained by using the route plan, thereby forming a speed curve.

"Departure point" means a position for generating a test vehicle and/or a background vehicle in a road network model (that is, a position where the test vehicle and/or background vehicle appear/appears), the generated vehicle driving into the road network model from the position.

"Destination point" means a position where a test vehicle and/or a background vehicle disappear/disappears from the road network model, that is, the vehicle drives out the road network model from the position, which may be the same as the departure point (that is, the destination point is the departure point), or may be different from the departure point.

The expression "in response to" is used for indicating a condition or a status on which a to-be-performed operation depends. When the condition or the status is satisfied, one or more to-be-performed operations may be real-time or have a set delay. Unless otherwise specified, there is no chronological order between the plurality of to-be-performed operations.

Exemplary applications of a method and apparatus for processing a driving simulation scenario provided in the embodiments of this disclosure are described below. The apparatus for processing a driving simulation scenario provided in the embodiments of this disclosure may adopt a form of software or a form of a combination of software and hardware. For example, the apparatus for processing a driving simulation scenario provided in the embodiments of this disclosure may be a sub-function of a driving simulation platform, so as to be configured in any type of apparatus for processing a driving simulation scenario such as a computer terminal, a server, a server cluster, or the like.

Next, a processing method in which a server implements the driving simulation scenario is exemplified to describe a driving simulation system including the server.

FIG. 1 is an exemplary schematic architectural diagram of a driving simulation system 100 according to an embodiment of this disclosure. Referring to FIG. 1, various users (such as autonomous driving algorithm developers, vehicle manufacturers, vehicle inspection agencies, and the like) of a terminal (a terminal 200-1 and a terminal 200-2 are illustrated) connect the terminal to a server 300 integrated with a driving simulation platform (including the apparatus for processing a driving simulation scenario provided in the embodiments of this disclosure) by using a network 400. The network 400 may be a wide area network, a local area network, or a combination thereof, and implements data transmission by using a wireless link.

The terminal (such as the terminal 200-1) is configured to transmit a simulative test request corresponding to an autonomous driving vehicle. The simulative test request carries a traveling policy of the autonomous driving vehicle.

In response to the simulative test request, the server 300 is configured to acquire map data corresponding to a test road network of the autonomous driving vehicle, establish a road network model for a simulative test of the autonomous driving vehicle based on the map data, generate a background vehicle and a test vehicle corresponding to autonomous driving vehicle at a departure point in the road network model, control a traveling status of the background vehicle so that the background vehicle travels into the road network model from the departure point and travels out of the road network model when the background vehicle travels to a destination point, monitor a route plan/speed plan made for the test vehicle based on a traveling policy in response to a traveling status of the background vehicle, and transmit back simulative test results of the test vehicle at different time points.

The terminal (such as the terminal 200-1) is further configured to display the simulative test results of the test vehicle at different time points by using a graphical interface (such as a graphical interface 210-1).

In some embodiments, a driving simulation client is configured on the terminal (such as the terminal 200-1), and the terminal (such as the terminal 200-1) achieves the simulative test of the autonomous driving vehicle based on the driving simulation client. When a user triggers a simulative test instruction, the driving simulation client transmits a simulative test request corresponding to the autonomous driving vehicle to the server 300, receives a simulative test result transmitted back by the server 300, and displays the received simulative test result by using a simulative test interface of the driving simulation client.

A driving simulation platform operated by the server 300 in the driving simulation system 100 is described below.

Figure 2:
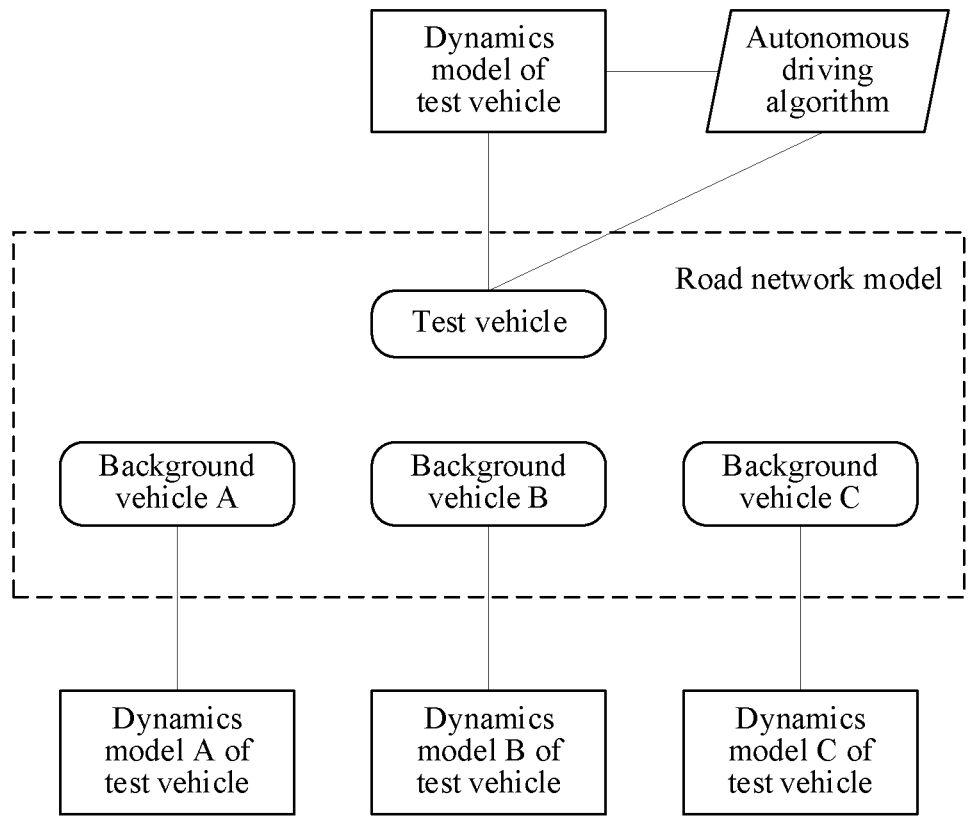
FIG. 2 is a schematic diagram of a simulative test principle of a driving simulation platform according to an embodiment of this disclosure.

FIG. 2 is a schematic diagram of a simulative test principle of a driving simulation platform according to an embodiment of this disclosure. Referring to FIG. 2, illustratively, during a simulative test on an autonomous driving vehicle by using the driving simulation platform, the server 300 acquires map data corresponding to a test road network of the autonomous driving vehicle from a database 500, performs three-dimensional modeling based on the map data to obtain a road network model for the simulative test, generates, in the road network model, a test vehicle conforming to a dynamics model of the autonomous driving vehicle and at least one background vehicle conforming to a preset dynamics model (which may be the same as or different from the dynamics model of the autonomous driving vehicle), controls the background vehicle to travel in the road network model, monitors a route plan and/or a speed plan made for the test vehicle based on a traveling policy (an autonomous driving algorithm) in response to a traveling status of the background vehicle, to verify whether decisions made by the test vehicle controlled by using the autonomous driving algorithm for changing lanes, overtaking, following, stopping, and the like in response to different road situations satisfy expectations, for example, for a vehicle inspection agency to determine whether the autonomous driving algorithm satisfies a safety standard, or for a vehicle manufacturer to determine whether to perform an actual road test for the autonomous driving algorithm.

Figure 3:
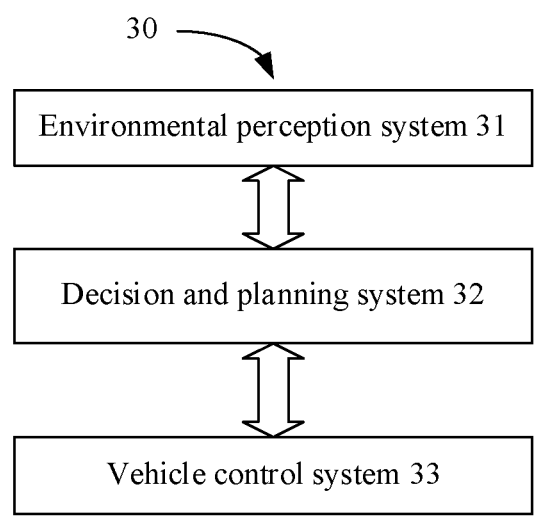
FIG. 3 is a schematic architectural diagram of an autonomous driving system according to an embodiment of this disclosure.

The autonomous driving algorithm for controlling the test vehicle is described as follows. In the autonomous driving vehicle, the autonomous driving algorithm is applicable to an autonomous driving system to achieve autonomous driving functions of different levels of the vehicle. FIG. 3 is a schematic architectural diagram of an autonomous driving system according to an embodiment of this disclosure. The autonomous driving system 30 includes an environmental perception system 31, a decision and planning system 32, and a vehicle control system 33. It may be understood that the foregoing systems included in the autonomous driving system 30 may also be referred to as subsystems or sub-modules in some embodiments, which are respectively described below.

The environmental perception system 31 is configured to perceive environment information, including a position, a speed, and an orientation of obstacles in the environment and object classifications (such as vehicle, pedestrian, and bicycle). In some embodiments, a status (including a speed, an acceleration, and a direction) of the vehicle and a high-precision map of a real-time position of the vehicle may also be perceived.

The decision and planning system 32 is configured to perform prediction on the perceived obstacles according to the environment information, a target position, an objective physical law, the obstacles, a surrounding environment, and accumulated historical data knowledge, so as to make macroscopic decisions, thereby ensuring the vehicle to smoothly reach a target status.

In some embodiments, decisions made by the decision and planning system 32 include lane selection, a reference vehicle speed, whether to normally follow obstacles (such as people, vehicles, and the like) on a road, whether to bypass obstacles (such as people, vehicles, and the like), whether to stop, whether to wait to give way when encountering traffic lights and pedestrians, whether to pass by other vehicles at intersections, and the like.

The decision and planning system 32 is further configured to perform traveling planning (including a route plan and a speed plan) according to environmental perceived information and decisions that are made, including selecting route points of a trajectory and a speed, a direction, an acceleration, and the like of a vehicle when the vehicle reaches each of the route points. The route points are continuous in time and space, and parameters such as the speed, the orientation, the acceleration, and the like of each of the route points fall within an actual operable physical range of the vehicle.

The vehicle control system 33 is configured to receive a traveling plan made by the decision and planning system 32, perform a dynamical calculation in combination with attributes of a vehicle body and external physical factors, convert a result of the calculation to vehicle control parameters such as a throttle amount, a brake amount, a steering wheel signal, and the like for electronic control of the vehicle, and perform operations according to the parameters.

Figure 4:
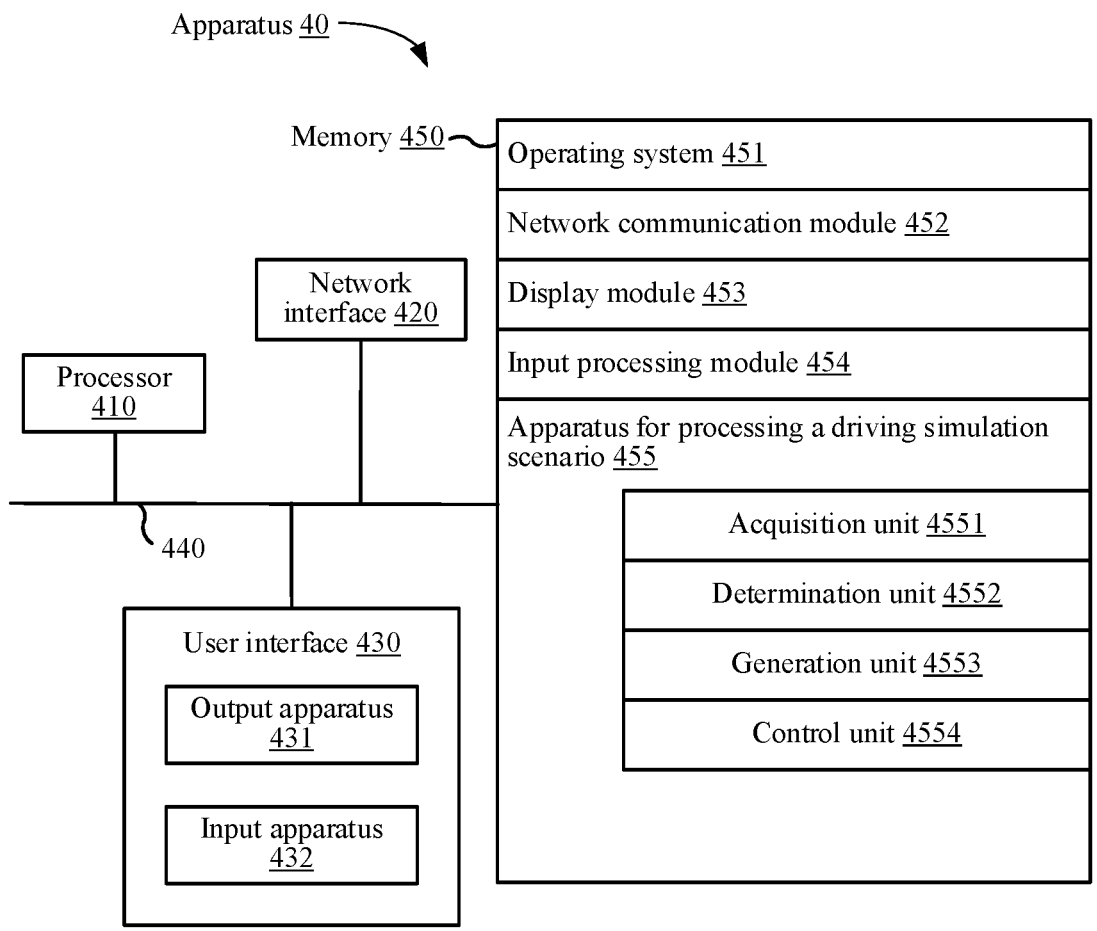
FIG. 4 is a schematic structural diagram of an apparatus for processing a driving simulation scenario according to an embodiment of this disclosure.

An exemplary structure of the apparatus for processing a driving simulation scenario provided in the embodiments of this disclosure is described below. The apparatus for processing a driving simulation scenario may be implemented in the server 300 shown in FIG. 1, or may be implemented by using various terminals such as a laptop computer, a desktop computer, and the like. FIG. 4 is a schematic structural diagram of an apparatus for processing a driving simulation scenario according to an embodiment of this disclosure. The apparatus 40 for processing a driving simulation scenario shown in FIG. 4 includes at least one processor 410, a memory 450, at least one network interface 420, and a user interface 430. The components in the apparatus 40 for processing a driving simulation scenario are coupled together by using a bus system 440. It may be understood that the bus system 440 is configured to implement connection and communication between the components. In addition to a data bus, the bus system 440 further includes a power bus, a control bus, and a status signal bus. However, for ease of clear description, all types of buses are labeled as the bus system 440 in FIG. 4.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that enable presentation of media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input buttons and controls.

The memory 450 may include a volatile memory or a non-volatile memory, or may include a volatile memory and a non-volatile memory. The non-volatile memory may be a read only memory (ROM), and the volatile memory may be a random access memory (RAM). The memory 450 described in this embodiment of this disclosure is to include any other suitable type of memories. The memory 450 exemplarily includes one or more storage devices that are physically away from the processor 410.

In some embodiments, the memory 450 may store data to support operations of the apparatus 40 for processing a driving simulation scenario. Examples of the data include programs, modules, and data structures, or a subset or a superset thereof, which are illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, in an example of implementing the apparatus for processing a driving simulation scenario provided in the embodiments of the application by using software, the memory 450 may further include an apparatus 455 for processing a driving simulation scenario provided in the embodiments of this disclosure. The apparatus 455 for processing a driving simulation scenario adopts software units in FIG. 4, including an acquisition unit 4551, a determination unit 4552, a generation unit 4553, and a control unit 4554. The acquisition unit is configured to acquire a plurality of route points in a road network model for driving simulation. The determination unit is configured to determine at least one at least one route point of the plurality of route points as a departure point and at least one route point as a destination point. The generation unit is configured to generate a background vehicle at the departure point in the road network model. The control unit is configured to control the background vehicle to travel into the road network model from the departure point and travel out of the road network model when the background vehicle travels to the destination point.

Certainly, the apparatus 455 for processing a driving simulation scenario provided in the embodiments of this disclosure may be implemented in a pure hardware form or a form of a combination of software and hardware. In an example of implementing the apparatus 455 for processing a driving simulation scenario provided in the embodiments of this disclosure by using hardware, a processor 410 in a form of a hardware decoding processor may be directly used to complete the method for processing a driving simulation scenario provided in the embodiments of this disclosure. For example, the method for processing a driving simulation scenario provided in the embodiments of this disclosure is performed by one or more application-specific integrated circuits (ASIC), a DSP, a PLD, a complex PLD (CPLD), a field-programmable gate array (FPGA), or other electronic elements.

Next, the method for processing a driving simulation scenario provided in the embodiments of this disclosure is described in combination with the foregoing exemplary application implementation of the driving simulation system implementing the embodiments of this disclosure and the apparatus for processing a driving simulation scenario.

Figure 5:
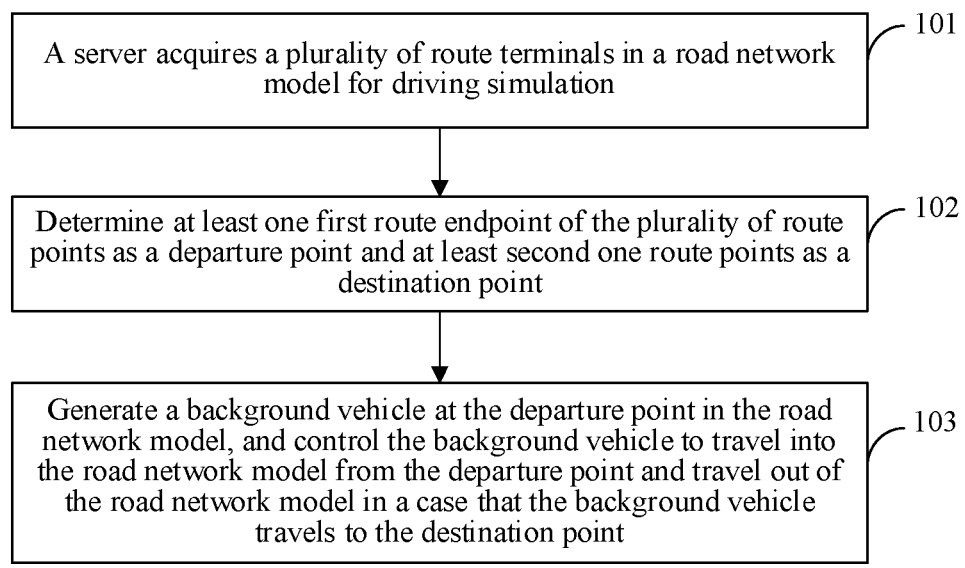
FIG. 5 is a schematic flowchart of a method for processing a driving simulation scenario according to an embodiment of this disclosure.

FIG. 5 is an exemplary schematic flowchart of a method for processing a driving simulation scenario according to an embodiment of this disclosure. The method for processing a driving simulation scenario provided in the embodiments of this disclosure is described with reference to FIG. 1 and FIG. 5 by way of an example in which a server (such as the server 300 in FIG. 1) implements the method for processing a driving simulation scenario.

Step 101: The server acquires a plurality of route points in a road network model for driving simulation.

In some embodiments, the server may acquire the plurality of route points in the road network model for driving simulation in the following manner:

The server acquires map data corresponding to a test road network of an autonomous driving vehicle, establishes a road network model for a simulative test of the autonomous driving vehicle based on the map data, and determines, based on a road network structure of the road network model, a plurality of route points in the road network model for driving simulation.

In implementation, the server may acquire map data stored in a database or receive map data transmitted by a terminal.

In some embodiments, the map data may include map types, which may be maps of different levels in the real world (such as a city map, an urban area map, and the like), or may be customized virtual world maps. A region may be a city level, an urban area level, or other levels. When the city/urban area and/is not specified, a city map is used by default.

In some embodiments, the map data may further include a lane type, a lane width, a lane quantity, and the like. The lane type can be, for example, a closed expressway, a pedestrian-and-vehicle mixed road, a one-way road, or a two-way road.

In some embodiments, the map data may further include traffic control facilities, such as positions and a quantity of roadblocks, route intersection positions of lanes, and statuses (such as a switching interval) of signal lights (including red, green, and yellow lights).

In some embodiments, the map data may further include a quantity/density of background vehicles, traveling characteristics of the background vehicles, such as whether the background vehicles are traveling in violation of regulations, a way of responding to traffic control facilities, dynamical characteristics of the background vehicles, that is, a dynamics model with which the background vehicles conform, and the like.

It may be understood that the map data may further include any map data required for the simulative test of the autonomous driving vehicle. For items not mentioned in the map data in the embodiments of this disclosure, the server 300 may adopt default settings of default items or to add items as needed.

In some embodiments, the server may establish the road network model for the simulative test of the autonomous driving vehicle in the following manner: The server performs three-dimensional modeling based on the map data to obtain a graphical three-dimensional mathematical model for traveling of the test vehicle and the background vehicle.

Step 102: Determine at least one first route point of the plurality of route terminals as a departure point and at least one second route terminal as a destination point.

In some embodiments, the server may determine the departure point and the destination point in the following manner:

The server selects, based on a distribution of the plurality of route points in the road network model, a first quantity of first route points as departure points and selects a second quantity of second route points as destination points. Specific values of the first quantity and the second quantity may be set according to actual needs. The first route point and the second route point may be different route points. For a vehicle, its departure point and destination point are different route points. For different vehicles, a departure point of a vehicle may be a destination point of another vehicle, which is not limited in the embodiments of this disclosure.

Step 103: Generate a background vehicle at the departure point in the road network model, and control the background vehicle to travel into the road network model from the departure point and travel out of the road network model when the background vehicle travels to the destination point.

Figure 6:
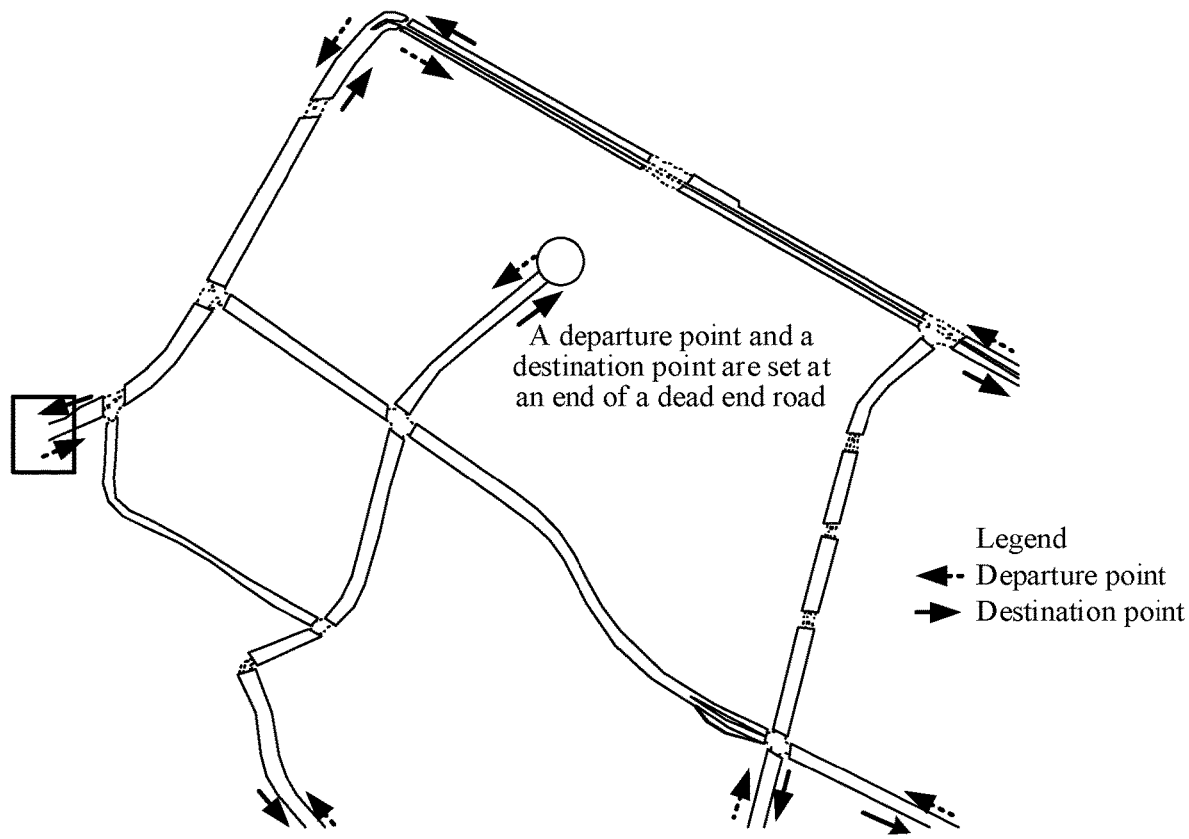
FIG. 6 is a schematic diagram of a departure point and a destination point in a road network model according to an embodiment of this disclosure.

Setting of the departure point and the destination point in the road network model is first described herein. FIG. 6 is a schematic diagram of a departure point and a destination point in a road network model according to an embodiment of this disclosure. Referring to FIG. 6, in an application, in order to avoid a sudden change (such as a vehicle collision) in a traffic status and visual abruptness caused by direct generation of a vehicle in the middle of a road network, the departure point may be selected from a road at an outer edge of a map or a dead end road in the map for the background vehicle and the test vehicle to travel into the road network model. Similarly, in order to avoid a sudden change (such as a vehicle collision) in a traffic status and visual abruptness caused by sudden disappearance of a vehicle from the road network model, in the implementation, the destination point may be selected from a road at an outer edge of a map or a dead end road in the map for the background vehicle and the test vehicle to travel out of the road network model. In the embodiments of this disclosure, the foregoing background vehicle may be used as a traffic flow of the test vehicle to simulate a real road situation.

In some embodiments, the server may generate, at the departure point in the road network model, the background vehicle and the test vehicle in the following manner: The server acquires a departure point in the road network model and generates a test vehicle if the departure point is determined satisfying a test vehicle generation condition, or the server generates a background vehicle if the departure point is determined to fail to satisfy the test vehicle generation condition but satisfy a background vehicle generation condition. In some embodiments, if the departure point is determined satisfying both the test vehicle generation condition and the background vehicle generation condition, the background vehicle is not generated. That is, the generation of the background vehicle is suspended, and a log is recorded. In some embodiments, if the departure point is determined satisfying both the test vehicle generation condition and the background vehicle generation condition, the background vehicle and the test vehicle are not generated. That is, the generation of the background vehicle and the test vehicle is suspended, and a log is recorded. In some embodiments, if the departure point is determined satisfying both the test vehicle generation condition and the background vehicle generation condition, it may be determined whether to generate the test vehicle at the departure point based on whether a test vehicle has been generated at other departure points. For example, if the test vehicle has been generated at any departure point, the test vehicle is not generated at the instant departure point, but a background vehicle is generated or generation of the background vehicle is suspended. If the test vehicle has been generated at no departure point, the test vehicle is generated at the departure point and the background vehicle is not generated.

Figure 7:
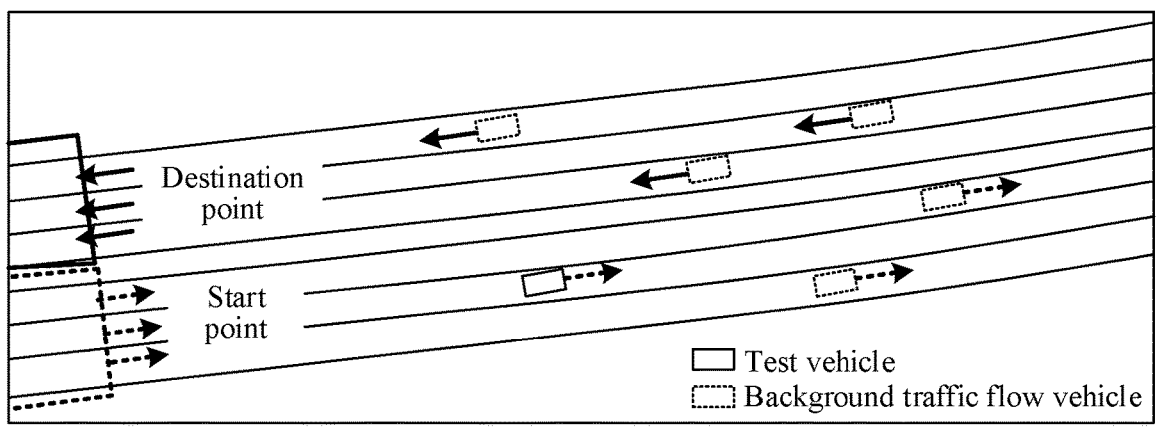
FIG. 7 is a schematic diagram of generating a test vehicle and a background vehicle at a departure point according to an embodiment of this disclosure.

In an application, the departure points for generating the test vehicle and the departure point for generating the background vehicle may be the same or different. Exemplarily, FIG. 7 is a schematic diagram of generating a test vehicle and a background vehicle at a departure point according to an embodiment of this disclosure.

During an implementation, there may be one or more departure points. For a specific departure point, the server first determines whether the departure point satisfies the test vehicle generation condition, and further determines whether the departure point satisfies the background vehicle generation condition if the departure point is determined to fail to satisfy the test vehicle generation condition, and determines whether to generate a background vehicle based on a result of the determination. That is, a generation priority of the test vehicle is higher than a generation priority of the background vehicle. In this way, the test vehicle is ensured to be smoothly generated during the simulative test, thereby avoiding a failure of the autonomous driving vehicle simulative test caused by a failure to generate the test vehicle.

In some embodiments, there are two or more departure points. When determining whether the departure point satisfies the test vehicle generation condition, the server may traverse the two or more departure points, and traverse, if a currently-traversed departure point is determined to correspond to two or more lanes, the two or more lanes, to determine whether the departure point corresponding to each of the lanes satisfies the test vehicle generation condition.

In some embodiments, the server determines that the test vehicle generation condition is satisfied if the departure point corresponding to the currently-traversed lane is determined to reach the test vehicle generation time and no other vehicles exist within a specific distance from the departure point.

In an implementation, a simulation clock is configured in the server, and the server may acquire a generation schedule of the test vehicle. In some embodiments, a generation time interval of the test vehicle may be a fixed time interval or may be set according to actual needs. In an implementation, the server determines whether a current time reaches the test vehicle generation time based on the generation schedule of the test vehicle, and the server further determines whether a blocking vehicle exists in a current lane when the test vehicle generation time is determined to be reached, that is, determines whether other vehicles exist within a specific distance. When other vehicles exist within the specific distance, the test vehicle is not generated, and a corresponding log is recorded. In this way, further traffic congestion caused by a failure to travel normally even the test vehicle is generated as a result of the blocking vehicle that exists is avoided.

In some embodiments, the server generates the background vehicle if the server determines that the departure point fails to satisfy the test vehicle generation condition (for example, when the test vehicle generation time is not reached and/or other vehicles exist within the specific distance from the departure point), a background vehicle generation time is reached, and no other vehicles exist within the specific distance. The generated background vehicle conforms to a preset dynamics model, the dynamics model being corresponding to a preset vehicle type.

According to an implementation, herein, the server determines whether the departure point satisfies the background vehicle generation condition (for example, whether the background vehicle generation time is reached and no other vehicles exist within the specific distance from the departure point) if the departure point is determined failing to satisfy the test vehicle generation condition. First, it is determined whether the background vehicle generation time is reached. If the background vehicle generation time is not reached, the background vehicle is not generated and a corresponding log is recorded. If the background vehicle generation time is reached, the server further determines whether a blocking vehicle exists in a current lane, that is, whether other vehicles exist within the specific distance. When other vehicles exist within the specific distance, the background vehicle is not generated, and a corresponding log is recorded. In this way, further traffic congestion caused by a failure to travel normally even the background vehicle is generated as a result of the blocking vehicle that exists is avoided.

The background vehicle generation time is described below. In an implementation, the server may acquire a background vehicle generation schedule. A background vehicle generation time interval may be set to a fixed value or conform to a specific probability distribution, such as a negative exponential distribution or an even distribution. In some embodiments, if a plurality of lanes exist at the start point, a calculation may be independently performed for each of the lanes. Vehicles are generated at a specific time interval, and a time offset is superimposed on an initial time, that is, each of the lanes has a corresponding background vehicle generation schedule. For example, the background vehicle is generated in a first lane at a $1^{st}$ second, $4^{th}$ second, $7^{th}$ second . . . , and is generated in a second lane at a $2^{nd}$ second, $5^{th}$ second, and $8^{th}$ second . . . (assuming that one vehicle is generated at a fixed interval of 3 seconds and an offset between the lanes is 1 second). In this way, a traffic jam caused when a plurality of background vehicles simultaneously enter the road network model or an accuracy decline of the driving simulation is avoided.

In an implementation, after the background vehicle is generated, the background vehicle is assigned a specific vehicle attribute (such as a vehicle type, an initial speed, a target status, and the like), and the background vehicle conforms to a dynamics model corresponding to the vehicle type.

In some embodiments, in order to perform the simulative test on the autonomous driving vehicles more accurately, the server ensures that background vehicles are fully distributed in the road network model before a test vehicle is generated in the road network model. Therefore, a specific simulation warm-up period of time exists before the test vehicle is generated. That is, only background vehicles are generated within a specific period of time (which may be set according to actual situations such as empirical values) at the beginning of the simulative test to ensure that a quantity of background vehicles in the road network model and a corresponding distribution satisfy requirements of the simulative test. Alternatively, before the test vehicle is generated, it is determined that a specific quantity of background vehicles (which may be set according to actual needs) already exist in the road network model.

In some embodiments, the server may control a traveling status of the background vehicle in the following manner:

The server acquires a traveling position and a traveling direction of the background vehicle, and the server plans at least one of a traveling speed and a traveling route of the background vehicle when the background vehicle is determined, based on the traveling position and the traveling direction, to travel to at least one of a route intersection position and a signal light position.

Figure 8:
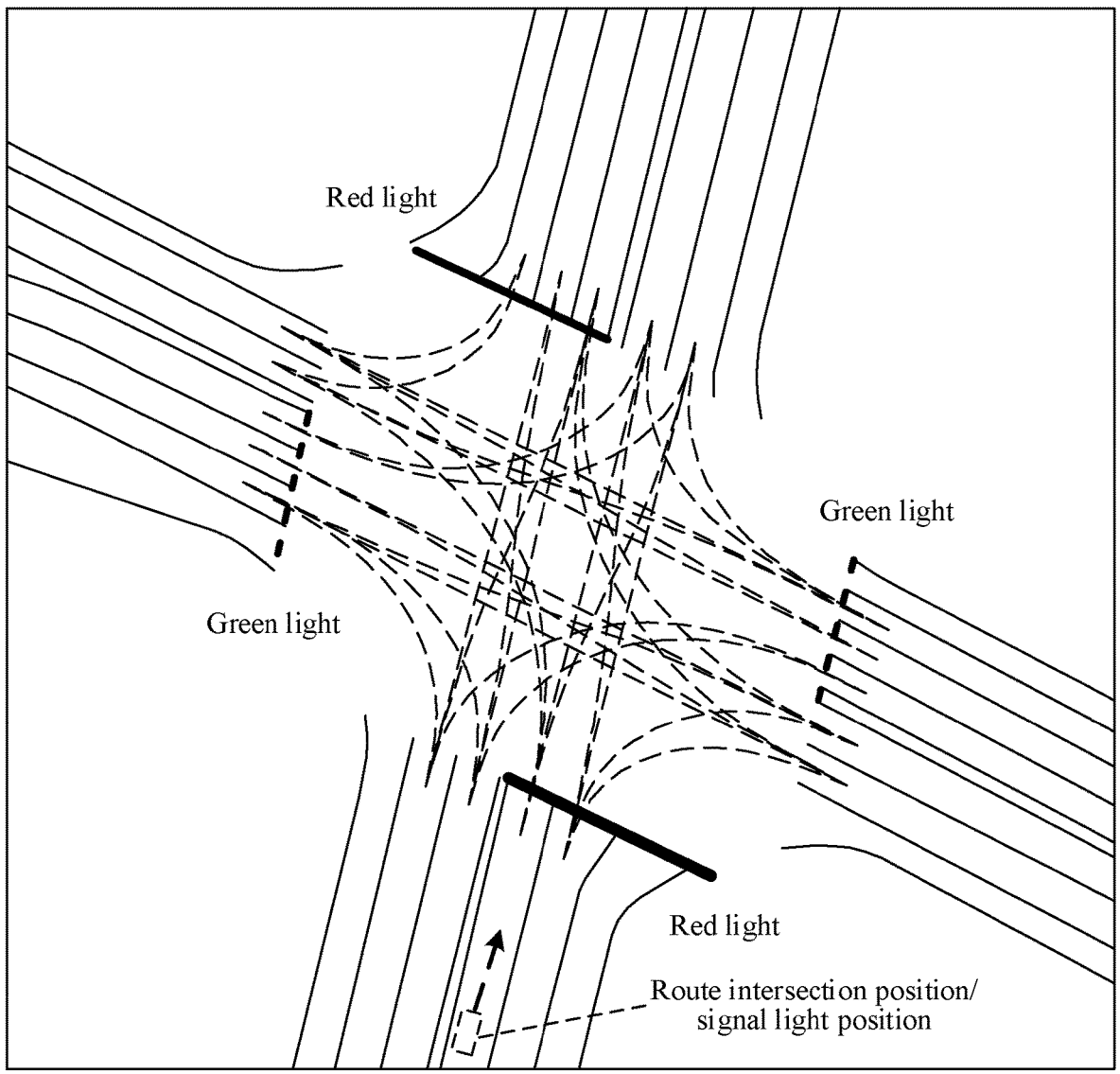
FIG. 8 is a schematic diagram in which a vehicle travels to a route intersection position and a signal light position according to an embodiment of this disclosure.

A case in which the background vehicle travels to the route intersection position and travels to the signal light position is described herein. FIG. 8 is a schematic diagram in which a vehicle travels to a route intersection position and a signal light position according to an embodiment of this disclosure. Referring to FIG. 8, in an implementation, when the background vehicle travels to the route intersection position, it means that a route intersection exists ahead in a traveling direction of the background vehicle, and a distance between the background vehicle and the route intersection is within a set first distance range. When the background vehicle travels to the signal light position, it means that a signal light exists ahead in the traveling direction of the background vehicle, and a distance between the background vehicle and the signal light is within a set second distance range.

Figure 9:
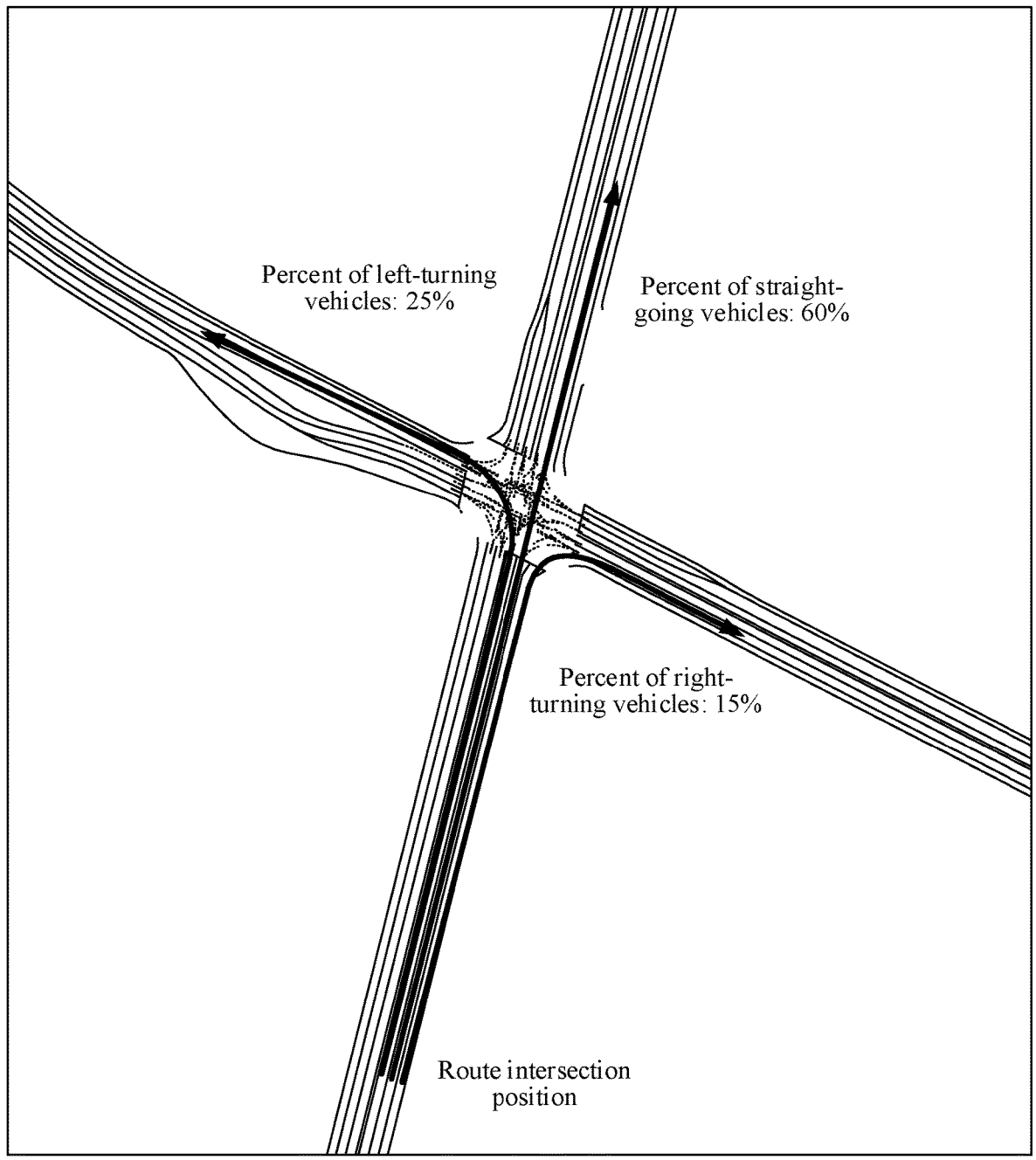
FIG. 9 is a schematic diagram of a turning percentage of background vehicles at a route intersection position according to an embodiment of this disclosure.

In some embodiments, the server determines whether the background vehicle travels to the route intersection position based on a current traveling position of the background vehicle, and the server plans a traveling route of the background vehicle when the background vehicle is determined to travel to the route intersection position, such as going straight, turning left, or turning right. In an implementation, a turning percentage of background vehicles in all lanes of the road network model that travel to the route intersection position may be set herein. FIG. 9 is a schematic diagram of a turning percentage of background vehicles at a route intersection position according to an embodiment of this disclosure. Referring to FIG. 9, among a plurality of background vehicles traveling to a route intersection position shown in FIG. 9, 25% of the background vehicles need to turn left, 15% of the background vehicles need to turn right, and 60% of the background vehicles need to go straight.

If the background vehicle is determined to travel to the route intersection position but has not reached the route intersection position, the server determines whether the background vehicle has reached the signal light position (that is, whether the current traveling position corresponds to the signal light position). When the background vehicle is determined to reach the signal light position, a corresponding signal light color is acquired, that is, a color of a signal light in the traveling direction is acquired, and a traveling speed of the background vehicle is controlled based on the signal light color.

In an application, the server may control the traveling speed of the background vehicle based on the signal light color in the following manner: The server determines whether the signal light color is green, and keeps the background vehicle to travel at a current speed if the signal light color is green; the server controls the background vehicle to decelerate at a constant speed to stop or run the yellow light at a constant speed if the signal light color is yellow instead of green, and controls the background vehicle to decelerate at a constant speed to stop if the signal light color is red instead of green. Certainly, in an implementation, a specific quantity of background vehicles may be controlled to run the red light, for example, to pass through the intersection at an increased or constant speed.

In some embodiments, if the server determines that the background vehicle travels to the route intersection position, the server further determines whether the background vehicle travels to the signal light position (that is, whether a signal light exists at the route intersection). If the background vehicle is determined to travel to the signal light position, a corresponding signal light color is acquired, and the traveling speed of the background vehicle is controlled based on the signal light color. Specifically, the server may determine whether the signal light color is green or yellow. If the signal light color is green or yellow, the server further determines whether the determined traveling route has a corresponding right-of-way rule, which indicates that a traveling priority of the determined traveling route is lower than a traveling priority of a vehicle that is not on the same lane as the test vehicle. For example, vehicles going straight proceeds over vehicles turning left, or vehicles turning right proceeds over vehicles turning left. If the traveling route has a corresponding right-of-way rule, the traveling speed of the background vehicle is controlled based on the right-of-way rule; for example, the background vehicle is controlled to decelerate at a constant speed to stop.

In some embodiments, if the server determines that the background vehicle travels to the route intersection position but does not travel to the signal light position (that is, no signal light exists at the route intersection position) the server further determines whether the determined traveling route has a corresponding right-of-way rule; the background vehicles keeps a current speed if the right-of-way rule does not exist, or the server controls the traveling speed of the background vehicle based on the corresponding right-of-way rule if the right-of-way rule exists.

In some embodiments, a speed bump and a yield sign are further disposed in the road network model. Correspondingly, the server determines whether the background vehicle reaches the speed bump and/or the yield sign based on the traveling position of the background vehicle and controls the speed of the background vehicle based on a result of the determination. For example, if a speed bump is determined to exist at a specific distance in front of the traveling position, the background vehicle is controlled to decelerate at a constant speed to a specific speed; if a yield sign exists at a specific distance in front of the traveling position, the background vehicle is controlled to decelerate at a constant speed to stop.

In some embodiments, the server further monitors a traveling plan made for the test vehicle based on a traveling policy in response to a traveling status of the background vehicle, the traveling plan including at least one of a route plan and a speed plan.

In some embodiments, the server may monitor, in the following manner, the traveling plan made for the test vehicle based on the traveling policy in response to the traveling status of the background vehicle:

The server acquires a traveling parameter of the test vehicle that corresponds to the traveling plan made based on the traveling policy, the traveling parameter including at least one of a speed parameter, a position parameter, and a direction parameter. The traveling policy is used for acquiring the traveling status of the background vehicle, and the traveling status includes at least one of a traveling position, a traveling direction, and a traveling speed. The server performs the traveling plan on the test vehicle based on the traveling status.

Exemplarily, the test vehicle determines that a traffic jam occurs at a specific distance in the traveling direction based on the traveling position, the traveling direction, and the traveling speed of the background vehicle in the road network model, and re-plans a route based on a target position (that is, a traveling end position), such as turning left or right when traveling to the route intersection position to change a route to the target position, thereby avoiding the congestion.

Description of the method for processing a driving simulation scenario provided in the embodiments of this disclosure proceeds.

Before driving simulation, a road network model is constructed. In some embodiments, the road network model may be a two-dimensional model or a three-dimensional model. The road network model is obtained based on a background map including the test road network. The background map may be a high-definition map made based on data collected from the real world, or may be a customized map created and edited by a user.

A departure point (that is, a start point) is disposed in the road network model. The start point is selectively located on a road at an outer edge of the map or a dead end road in the map for generation of a background vehicle and a test vehicle and for the background vehicle and the test vehicle to travel into the road network model. In this way, a sudden change in a traffic status and visual abruptness caused by direct generation of a vehicle in the middle of a road and a vehicle collision resulted therefrom can be avoided.

A destination point is further disposed in the road network model for the background vehicle and the test vehicle to travel out of the road network model. That is, when the vehicles travel to the destination point, the vehicles are removed from the road network model regardless of lanes where they are located. The destination point may be selectively located on a road at an outer edge of the map or a dead end road in the map to avoid a sudden change in a traffic status and visual abruptness caused by sudden disappearance of the vehicles from the middle of a road.

In some embodiments, the method for processing a driving simulation scenario may include four parts: a simulative test warm-up, generation of a test vehicle and a background vehicle, background vehicle turning decision, and test vehicle traveling plan monitoring. There is no sequence for performing the generation of a test vehicle and a background vehicle, the background vehicle turning decision, and the test vehicle traveling plan monitoring, which may be implemented simultaneously. Details are respectively provided below.

I. Simulative Test Warm-Up

Before the driving simulation starts, a simulative test warm-up is performed. At this stage, only background vehicles are generated, so that sufficient background vehicles are distributed in each lane in the road network model, thereby ensuring that the road network model has enough background vehicles for a test vehicle to perform a simulative test. In an implementation, a period of time (which may be set according to an actual situation) may be set as the simulative test warm-up stage, or a stage in which a quantity of background vehicles in the road network model increases from zero to a specific quantity is determined as the simulative test warm-up stage.

The generation of background vehicles in the simulative test warm-up stage is described. In an implementation, one or more background vehicle generation schedules are set. If a plurality of roads exist at one departure point, a background vehicle generation schedule may be set corresponding to each of the roads, and background vehicles are generated based on the generation schedule. While the background vehicles are generated, specific vehicle attributes (such as a vehicle type, an initial speed, and the like) are assigned, and background vehicles travel into the road network model as a simulation clock advances.

A background vehicle generation interval may be set to a fixed value (such as 3 seconds), or may conform to a probability distribution herein, such as a negative exponential distribution or an average distribution. If a plurality of lanes exist at the start point, a calculation may be independently performed for each of the lanes. Vehicles are generated at a specific interval, and a time offset is superimposed on an initial time to prevent a plurality of vehicles from simultaneously entering the system. For example, the background vehicle is generated in a first lane at a $1^{st}$ second, $4^{th}$ second, $7^{th}$ second . . . , and is generated in a second lane at a $2^{nd}$ second, $5^{th}$ second, and $8^{th}$ second . . . (assuming that one vehicle is generated at a fixed interval of 3 seconds and an offset between the lanes is 1 second).

II. Generation of a Test Vehicle and a Background Vehicle

After the simulative test warm-up, not only background vehicles may be generated in the road network model, but also test vehicles may be generated. Similarly, the test vehicles also have corresponding generation schedules. A test vehicle generation interval may be set to a fixed value, or may be set according to actual needs. If a generation time of a test vehicle coincides with a generation time of a background vehicle, generation of the background vehicle is suspended until a generation time of a next background vehicle to be generated in the lane comes. If the test vehicle cannot be generated at a preset time (for example, as a result of being blocked by overflowing vehicles), a start time is delayed by a simulation step $\Delta t$ until the position satisfies a generation condition, and then the test vehicle is generated.

A generation priority of the test vehicle is set to be higher than a generation priority of the background vehicle. In other words, if a departure point satisfies both a test vehicle generation condition (a generation time is reached and no blocking vehicle exists in a corresponding lane) and a background vehicle generation condition (a generation time is reached and no blocking vehicle exists in a corresponding lane), the test vehicle, rather than the background vehicle, is generated, and a log is recorded. Specifically, generation of a test vehicle and a background vehicle is described by using an example in which a plurality of departure points exist in the road network model and a departure point corresponding to a plurality of roads exists as an example.

Figure 10:
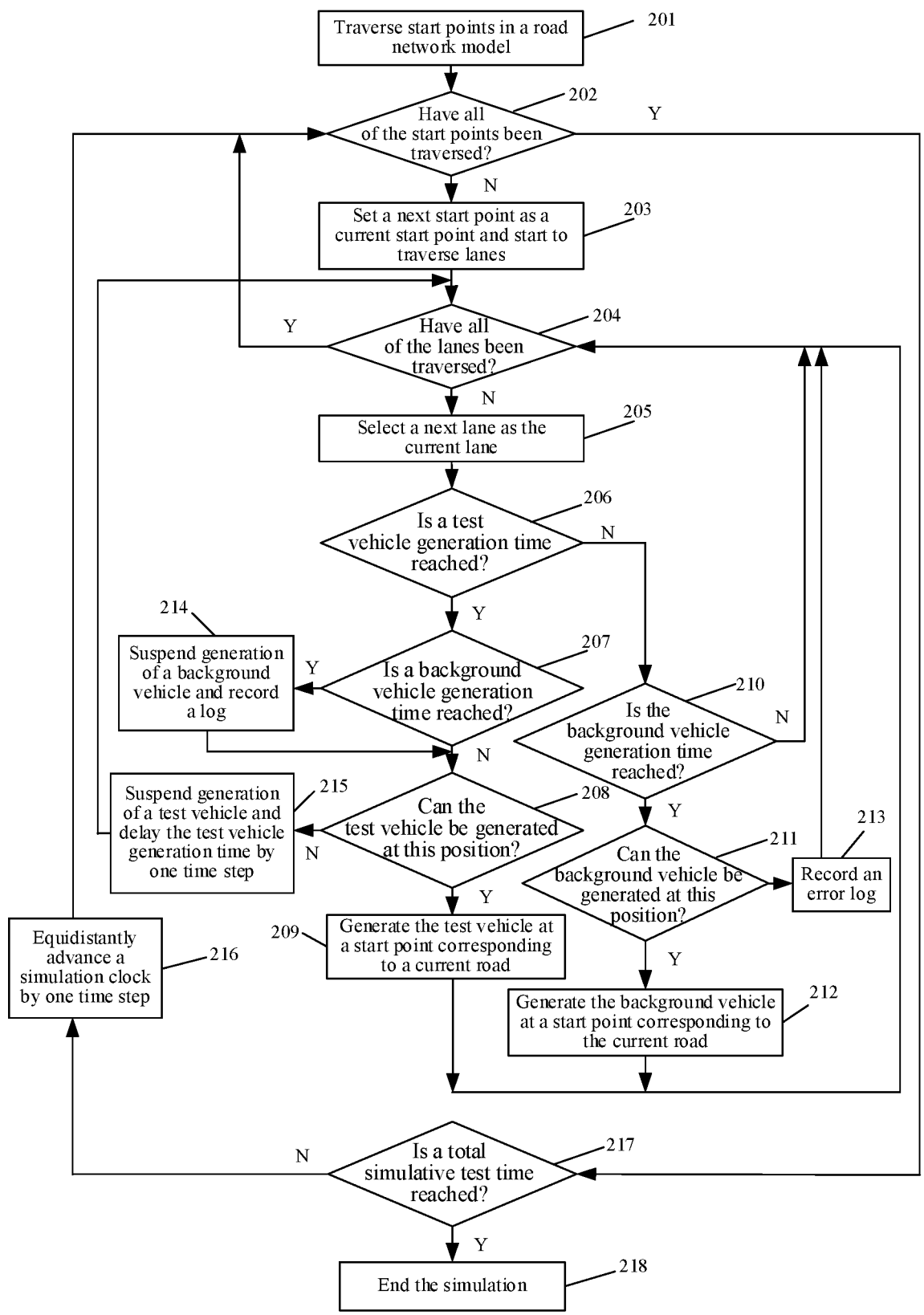
FIG. 10 is a schematic flowchart of generating a test vehicle and a background vehicle according to an embodiment of this disclosure.

FIG. 10 is a schematic diagram of generating a test vehicle and a background vehicle according to an embodiment of this disclosure. Referring to FIG. 10, the generation of a test vehicle and a background vehicle includes the following steps:

Step 201: A server traverses start points in a road network model.

Step 202: The server determines whether all of the start points have been traversed, and performs step 203 if not all of the start points have been traversed, or performs step 217 if all of the start points have been traversed.

Step 203: The server sets a next start point as the current start point, and traverses lanes corresponding to the current start point.

Step 204: The server determines whether all of the lanes corresponding to the current start point have been traversed, and performs step 202 if all of the start points have been traversed, or performs step 205 if there is a start point that is not traversed.

Step 205: The server selects a next lane as the current lane.

Step 206: The server determines whether a test vehicle generation time is reached, and performs step 207 if the test vehicle generation time is reached, or performs step 210 if the test vehicle generation time is not reached.

Step 207: The server determines whether a background vehicle generation time is reached, and performs step 208 if the background vehicle generation time is reached, or performs step 214 if the background vehicle generation time is not reached.

Step 208: The server determines whether the test vehicle can be generated at this position, and performs step 209 if the test vehicle can be generated at this position, or performs step 215 if the test vehicle cannot be generated at this position.

Determining whether the test vehicle can be generated at this position herein means determining whether a blocking vehicle exists in the current lane.

Step 209: The server generates the test vehicle at a start point corresponding to a current road, and performs step 204.

Step 210: The server determines whether the background vehicle generation time is reached, and performs step 211 if the background vehicle generation time is reached, or performs step 204 if the background vehicle generation time is not reached.

Step 211: The server determines whether the background vehicle can be generated at this position, and performs step 212 if the background vehicle can be generated at this position, or performs step 213 if the background vehicle cannot be generated at this position.

Determining whether the background vehicle can be generated at this position herein means determining whether a blocking vehicle exists in the current lane.

Step 212: The server generates the background vehicle at a start point corresponding to a current road, and performs step 204.

In an implementation, the generated background vehicle conforms to a dynamics model and is assigned specific vehicle attributes (such as a vehicle type, an initial speed, and the like).

Step 213: The server records an error log and performs step 204.

Step 214: The server suspends the generation of the background vehicle and records a log.

Step 215: The server suspends the generation of the test vehicle, delays the test vehicle generation time by one time step, and performs step 204.

One time step herein is Δt, which may be specifically set according to actual needs.

Step 216: The server equidistantly advances a simulation clock by one time step.

Step 217: The server determines whether a total simulative test time is reached, and performs step 218 if the total simulative test time is reached, or performs step 216 if the total simulative test time is not reached.

Step 218: The server ends the simulation.

III. Background Vehicle Turning Decision

Route intersections such as crossroads and T-junctions as well as signal lights are disposed in the road network model. By configuring the turning decision, traveling background vehicles are organized and regulated. For example, when the background vehicle travels to a position at a specific distance from a route intersection and/or a signal light position, a traveling route (going straight, turning left, and turning right) and a traveling speed of the background vehicle are controlled.

A color of the signal light includes red, yellow, and green. The background vehicle may react to the color of the signal light in the following manner: keep traveling at a constant current speed if the color is green, decelerate to stop if the color is red, and decelerate at a specific probability to stop or run the yellow light at a constant speed if the color is yellow.

When the background vehicle travels to a route intersection, a corresponding right-of-way rule may be set for turning left or turning right of the background vehicle, such as going straight proceeds turning left or turning right proceeds turning left.

For a plurality of background vehicles traveling to the route intersection, a turning decision point is disposed at a position at a specific distance (such as 30 meters) to the route intersection. When the vehicle travels to the decision point (that is, the foregoing route intersection position), a traveling direction (such as turning left, going straight, or turning right) is assigned according to a percentage set in advance. Then the background vehicle changes to a corresponding downstream lane according to the traveling direction and travels according to a corresponding signal light.

Figure 11:
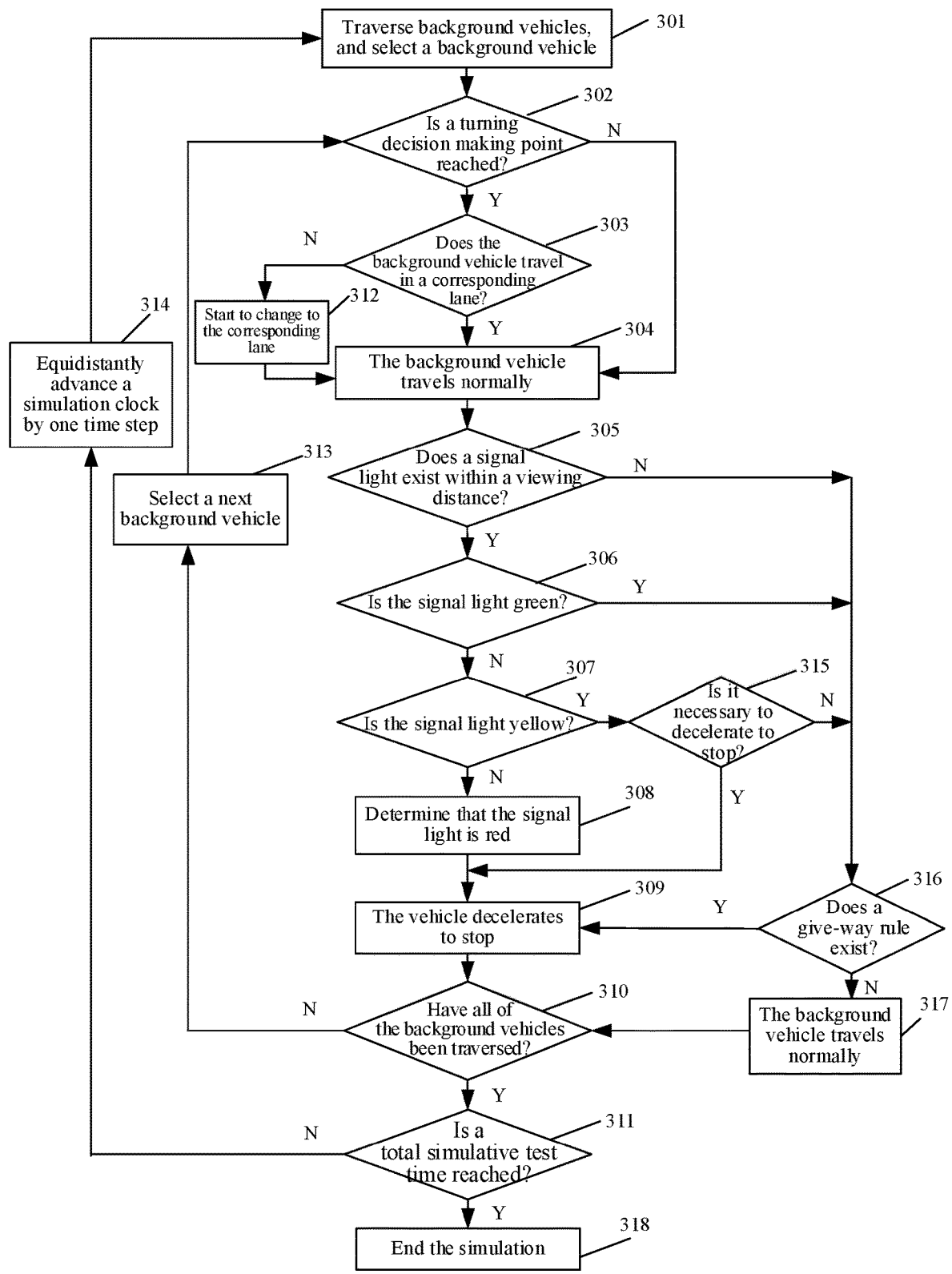
FIG. 11 is a schematic flowchart of turning decision control of a background vehicle according to an embodiment of this disclosure.

FIG. 11 is a schematic flowchart of turning decision control of a background vehicle according to an embodiment of this disclosure. Referring to FIG. 11, the turning decision control of a background vehicle includes the following steps:

Step 301. A server traverses background vehicles and selects a background vehicle.

In actual application, a background vehicle in a road network model may carry a corresponding identifier to uniquely identify the background vehicle.

Step 302: The server determines whether the background vehicle reaches a turning decision point, and performs step 303 when the background vehicle reaches the turning decision point, or performs step 304 when the background vehicle does not reach the turning decision point.

Step 303: The server determines whether the background vehicle travels in a corresponding lane, and performs step 304 if the background vehicle travels in the corresponding lane, or performs step 312 if the background vehicle does not travel in the corresponding lane.

When the background vehicle travels to the turning decision point, a traveling route of the background vehicle is re-planned herein, such as going straight, turning left, and turning right. Correspondingly, determining whether the background vehicle travels in the corresponding lane means determining whether the background vehicle is already in a re-planned lane.

Step 304: The server controls the background vehicle to normally travel.

Controlling the background vehicle to normally travel herein means controlling the background vehicle to travel at a current speed in a corresponding lane.

Step 305: The server determines whether a signal light exists within a viewing distance, and performs step 306 if the signal light exists, or performs step 316 if no signal light exists.

A value of the viewing distance may be set according to actual situations or empirical values herein.

Step 306: The server determines whether a signal light is green, and performs step 307 if the signal light is green, or performs step 316 if the signal light is not green.

Step 307: The server determines whether the signal light is yellow, and performs step 308 if the signal light is yellow, or performs step 315 if the signal light is not yellow.

Step 308: The server determines that the signal light is red.

Step 309: The server controls the background vehicle to decelerate to stop.

Step 310: The server determines whether all of the background vehicles have been traversed, and performs step 311 if all of the background vehicles have been traversed, or performs step 317 if not all of the background vehicles have been traversed.

Step 311: The server determines whether a total simulative test time is reached, and performs step 318 if the total simulative test time is reached, or performs step 314 if the total simulative test time is not reached.

Step 312: The server controls the background vehicle to change to a corresponding lane.

Step 313: The server selects a next background vehicle.

Step 314: The server equidistantly advances a simulation clock by a time step and performs step 301.

Step 315: The server determines whether it is necessary to decelerate to stop, and performs step 309 if it is necessary to decelerate to stop, or performs step 316 if it is unnecessary to decelerate to stop.

Step 316: The server determines whether a right-of-way rule exists, and performs step 309 if a right-of-way rule exists, or performs step 317 if no right-of-way rule exists.

Step 317: The server controls the background vehicle to normally travel.

Step 318: The server ends the simulation.

IV. Test Vehicle Traveling Plan Monitoring

During the driving simulation, the server monitors traveling parameters of the test vehicle, including acquiring a traveling speed, a traveling position, and a traveling direction of the test vehicle to determine a reaction made by the test vehicle based on a traveling status of the background vehicle, such as giving way, changing a lane, overtaking, following, stopping, and the like.

Certain applications of the embodiments of this disclosure may have some of the following beneficial effects:

A departure point and a destination point are disposed in the road network model, so that a vehicle is generated and disappears at specific positions, avoiding a sudden change (such as a vehicle collision) in a traffic status and visual abruptness caused by generation of disappearance of a vehicle at unspecified positions.

A background vehicle and a test vehicle corresponding to an autonomous driving vehicle are generated at the departure point in the road network model. In this way, automatic generation of the background vehicle and the test vehicle are achieved during the driving simulation, and processing efficiency of the driving simulation scenario is improved.

A traveling status of the background vehicle is controlled, so that the background vehicle travels into the road network model from the departure point and travels out of the road network model when the background vehicle travels to the destination point. In this way, by controlling the traveling status of the background vehicle, verification of a traveling policy of the test vehicle is achieved.

If the departure point satisfies both a test vehicle generation condition and a background vehicle generation condition, a test vehicle, rather than the background vehicle, is generated, that is, a generation priority of the test vehicle is higher than a generation priority of the background vehicle. In this way, the test vehicle is ensured to be smoothly generated during the simulative test, thereby avoiding a failure of the autonomous driving vehicle simulative test caused by a failure to generate the test vehicle.

An embodiment of this disclosure further provides an apparatus for processing a driving simulation scenario, the apparatus including:

an acquisition unit, configured to acquire a plurality of route points in a road network model for driving simulation;

a determination unit, configured to determine at least one first route point of the plurality of route points as a departure point and at least one second route point as a destination point; and a generation unit, configured to generate a background vehicle, for example, configured to generate a background vehicle at the departure point in the road network model; and a control unit, configured to control the background vehicle to travel into the road network model from the departure point and travel out of the road network model when the background vehicle travels to the destination point.

In some embodiments, the acquisition unit is further configured to acquire map data corresponding to a test road network of an autonomous driving vehicle, establish a road network model for a simulative test of the autonomous driving vehicle based on the map data, and determine, based on a road network structure of the road network model, a plurality of route points in the road network model for driving simulation.

The determination unit is further configured to select a first quantity of first route points as departure points and selecting a second quantity of second route points as destination points, based on a distribution of the plurality of route points in the road network model.

The generation unit is further configured to: acquire the departure point in the road network model;

generate a test vehicle if the departure point is determined to satisfy a test vehicle generation condition; and generate the background vehicle if the departure point is determined to fail to satisfy the test vehicle generation condition but satisfy a background vehicle generation condition.

In some embodiments, the generation unit is further configured to: traverse, in response to a case that there are at least two departure points, the at least two departure points;

traverse, if a currently-traversed departure point is determined to correspond to at least two lanes, the at least two lanes; and generate the test vehicle if a departure point corresponding to a currently-traversed lane is determined to reach a test vehicle generation time and no other vehicles exist within a specific distance.

In some embodiments, the generation unit is further configured to generate the background vehicle if the departure point is determined to fail to satisfy the test vehicle generation condition and reach a background vehicle generation time, and no other vehicles exist within the specific distance, the background vehicle conforming to a preset dynamics model, the dynamics model being corresponding to a preset vehicle type.

In some embodiments, the control unit is further configured to acquire a traveling position and a traveling direction of the background vehicle; and plan at least one of a traveling speed and a traveling route of the background vehicle when the background vehicle is determined, based on the traveling position and the traveling direction, to travel to at least one of a route intersection position and a signal light position.

In some embodiments, the control unit is further configured to: determine the traveling route of the background vehicle when the background vehicle travels to the route intersection position;
  determine a corresponding signal light color based on the traveling route if a signal light exists at the route intersection position; and
  control the traveling speed of the background vehicle based on the determined signal light color.

In some embodiments, the control unit is further configured to: control, if no signal light exists at the route intersection position and the traveling route has a corresponding right-of-way rule, the traveling speed of the background vehicle based on the right-of-way rule,
  the right-of-way rule indicating that a traveling priority of the traveling route is lower than a traveling priority of a vehicle that is not on the same lane as the test vehicle.

In some embodiments, the control unit is further configured to: control, if the signal light color is green or yellow and the traveling route has a corresponding right-of-way rule, the traveling speed of the background vehicle based on the right-of-way rule.

In some embodiments, the control unit is further configured to: determine a corresponding signal light color if the traveling position does not correspond to the route intersection position but corresponds to the signal light position; and
  control the traveling speed of the background vehicle based on the signal light color.

In some embodiments, the apparatus further includes:
  a monitoring unit configured to monitor a traveling plan made for the test vehicle based on a traveling policy in response to a traveling status of the background vehicle, the traveling plan including at least one of a route plan and a speed plan.

In some embodiments, the monitoring unit is further configured to acquire a traveling parameter of the test vehicle that corresponds to the traveling plan made based on the traveling policy, the traveling parameter including at least one of a speed parameter, a position parameter, and a direction parameter, the traveling policy being used for acquiring the traveling status of the background vehicle, the traveling status including at least one of a traveling position, a traveling direction, and a traveling speed; and performing the traveling plan on the test vehicle based on the traveling status.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

An embodiment of this disclosure provides a storage medium storing executable instructions, the executable instructions, when executed by a processor, causing the processor to perform the method for processing a driving simulation scenario provided in the embodiments of this disclosure. For example, the method for processing a driving simulation scenario shown in FIG. 5 includes the following steps:

acquiring a plurality of route points in a road network model for driving simulation;
determining at least one first route point of the plurality of route points as a departure point and at least one second route point as a destination point; and
generating a background vehicle, and controlling the background vehicle to travel into the road network model from the departure point and travel out of the road network model when the background vehicle travels to the destination point.

In some embodiments, the processor is further configured to perform the following steps:
  acquiring the departure point in the road network model; and
  generating a test vehicle if the departure point is determined to satisfy a test vehicle generation condition.

The processor is further configured to perform the following step:
  generating the background vehicle if the departure point is determined to fail to satisfy the test vehicle generation condition but satisfy a background vehicle generation condition.

In some embodiments, the processor is further configured to perform the following steps:
  traversing, in response to a case that there are two or more departure points, the two or more departure points;
  traversing, if a currently-traversed departure point is determined to correspond to two or more lanes, the two or more lanes; and
  generating the test vehicle if a departure point corresponding to a currently-traversed lane is determined to reach a test vehicle generation time and no other vehicles exist within a specific distance.

In some embodiments, the processor is further configured to perform the following step:
  generating the background vehicle if the departure point is determined to fail to satisfy the test vehicle generation condition and reach a background vehicle generation time, and no other vehicles exist within the specific distance,
  the background vehicle conforming to a preset dynamics model, the dynamics model being corresponding to a preset vehicle type.

In some embodiments, the processor is further configured to perform the following steps:
  acquiring a traveling position and a traveling direction of the background vehicle; and
  planning at least one of a traveling speed and a traveling route of the background vehicle if the background vehicle is determined, based on the traveling position and the traveling direction, to travel to at least one of a route intersection position and a signal light position.

In some embodiments, the processor is further configured to perform the following steps:
  determining the traveling route of the background vehicle when the background vehicle travels to the route intersection position;
  determining a corresponding signal light color based on the traveling route when a signal light exists at the route intersection position; and
  controlling the traveling speed of the background vehicle based on the determined signal light color.

In some embodiments, the processor is further configured to perform the following step:
  controlling, if no signal light exists at the route intersection position and the traveling route has a corresponding right-of-way rule, the traveling speed of the background vehicle based on the right-of-way rule, the right-of-way rule indicating that a traveling priority of the traveling route is lower than a traveling priority of a vehicle that is not on the same lane as the test vehicle.

In some embodiments, the processor is further configured to perform the following step:

controlling, if the signal light color is green or yellow and the traveling route has a corresponding right-of-way rule, the traveling speed of the background vehicle based on the right-of-way rule.

In some embodiments, the planning at least one of a traveling speed and a traveling route of the background vehicle when the background vehicle is determined, based on the traveling position and the traveling direction, to travel to at least one of a route intersection position and a signal light position includes:

determining a corresponding signal light color if the traveling position does not correspond to the route intersection position but corresponds to the signal light position; and controlling the traveling speed of the background vehicle based on the signal light color.

In some embodiments, the processor is further configured to perform the following steps:

generating a test vehicle at the departure point in the road network model; and monitoring a traveling plan made for the test vehicle based on a traveling policy in response to a traveling status of the background vehicle, the traveling plan including at least one of a route plan and a speed plan.

In some embodiments, the processor is further configured to perform the following steps:

acquiring a traveling parameter of the test vehicle that corresponds to the traveling plan made based on the traveling policy, the traveling parameter including at least one of a speed parameter, a position parameter, and a direction parameter, the traveling policy being used for acquiring the traveling status of the background vehicle, the traveling status including at least one of a traveling position, a traveling direction, and a traveling speed; and performing the traveling plan on the test vehicle based on the traveling status.

In some embodiments, the processor is further configured to perform the following step:

selecting a first quantity of first route points as departure points and selecting a second quantity of second route points as destination points, based on a distribution of the plurality of route points in the road network model.

The foregoing descriptions related to the apparatus for processing a driving simulation scenario are similar to the descriptions of the foregoing methods. For the descriptions of beneficial effects of the same methods, details are not described again. For technical details of the apparatus for processing a driving simulation scenario not disclosed in the embodiments of this disclosure, refer to the descriptions of the method embodiments in this disclosure.

All or some steps of the method according to the embodiments may be implemented by a program instructing relevant hardware. The program may be stored in a computer-readable storage medium. When the program is executed, the steps of the method according to the embodiments are performed. The storage medium may be any medium that is capable of storing program codes, such as a RAM, a ROM, a magnetic disk, or an optical disk.

Alternatively, when the integrated unit of this disclosure is implemented in a form of a software functional module and sold or used as an independent product, the integrated unit may be stored in a computer-readable storage medium. Based on such an understanding, the technical solutions of the embodiments of this disclosure essentially, or the part contributing to the related art, may be implemented in a form of a software product. The computer software product is stored in a storage medium, and includes several instructions for instructing a computer device (which may be a personal computer, a server, a network device, or the like) to perform all or a part of the methods described in the embodiments of this disclosure. Moreover, the foregoing storage medium includes all media that can store program code such as: a mobile storage device, a RAM, a ROM, a magnetic disc, or an optical disc. The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for processing a driving simulation scenario by an electronic apparatus, the method comprising:

acquiring a plurality of route points in a road network model for driving simulation;

determining one or more departure points and one or more destination points from the plurality of route points;

acquiring the one or more departure points in the road network model;

generating a test vehicle when the one or more departure points satisfy a test vehicle generation condition;

generating a background vehicle when the one or more departure points fail to satisfy the test vehicle generation condition but satisfy a background vehicle generation condition; and controlling the background vehicle to travel in the road network model from one of the one or more departure points to a corresponding destination point of the one or more destination points, where the background vehicle is removed from the simulation scenario.

2. The method according to claim 1, wherein generating the test vehicle when the one or more departure points satisfy the test vehicle generation condition comprises:

traversing, when the one or more departure points comprise two or more departure points, the one or more departure points;

for a currently-traversed departure point included in the two or more departure points, traversing, when the currently-traversed departure point corresponds to two or more lanes, the two or more lanes; and generating the test vehicle when the currently-traversed departure point corresponding to a currently-traversed lane reaches a test vehicle generation time and no other vehicle exists within a preset distance from the currently-traversed departure point.

3. The method according to claim 1, wherein generating the background vehicle when the one or more departure points fail to satisfy the test vehicle generation condition but satisfy the background vehicle generation condition comprises:

generating the background vehicle when the one or more departure points fail to satisfy the test vehicle generation condition and reach a background vehicle generation time and no other vehicle exists within a preset distance, wherein the background vehicle conforms to a preset dynamics model and the dynamics model corresponds to a preset vehicle type.

4. The method according to claim 1, further comprising:
acquiring a traveling position and a traveling direction of the background vehicle; and
planning at least one of a traveling speed or a traveling route of the background vehicle when it is determined, based on the traveling position and the traveling direction, that the background vehicle travels to at least one of a route intersection position or a traffic signal light position.

5. The method according to claim 4, wherein planning at least one of the traveling speed or the traveling route of the background vehicle when it is determined, based on the traveling position and the traveling direction, that the background vehicle travels to at least one of the route intersection position or the traffic signal light position comprises:
determining the traveling route of the background vehicle when the background vehicle travels to the route intersection position;
determining a corresponding traffic signal light color based on the traveling route when a traffic signal light exists at the route intersection position; and
controlling the traveling speed of the background vehicle based on the determined traffic signal light color.

6. The method according to claim 5, further comprising:
controlling, when no traffic signal light exists at the route intersection position and the traveling route has a corresponding right-of-way rule, the traveling speed of the background vehicle based on the right-of-way rule, the right-of-way rule indicating that a traveling priority of the traveling route is lower than a traveling priority of a vehicle that is not on the same lane as the background vehicle.

7. The method according to claim 5, wherein controlling the traveling speed of the background vehicle based on the determined traffic signal light color comprises:
controlling, when the traffic signal light color is green or yellow and the traveling route has a corresponding right-of-way rule, the traveling speed of the background vehicle based on the right-of-way rule.

8. The method according to claim 4, wherein planning at least one of the traveling speed or the traveling route of the background vehicle when it is determined, based on the traveling position and the traveling direction, that the background vehicle travels to at least one of the route intersection position or the traffic signal light position comprises:
determining a corresponding traffic signal light color when the traveling position does not correspond to the route intersection position but corresponds to the traffic signal light position; and
controlling the traveling speed of the background vehicle based on the traffic signal light color.

9. The method according to claim 1, further comprising:
monitoring a traveling plan made for the test vehicle based on a traveling policy in response to a traveling status of the background vehicle, the traveling plan comprising at least one of a route plan or a speed plan.

10. The method according to claim 9, wherein monitoring the traveling plan made for the test vehicle based on the traveling policy in response to the traveling status of the background vehicle comprises:

acquiring a traveling parameter of the test vehicle corresponding to the traveling plan, wherein:
the traveling parameter comprises at least one of a speed parameter, a position parameter, or a direction parameter;
the traveling policy is used for acquiring the traveling status of the background vehicle; and
the traveling status comprises at least one of a traveling position, a traveling direction, or a traveling speed; and
performing the traveling plan on the test vehicle based on the traveling status.

11. The method according to claim 1, wherein determining one or more departure points and one or more destination points from the plurality of route points comprises:
based on a distribution of the plurality of route points in the road network model, selecting a first quantity of first route points as the one or more departure points and selecting a second quantity of second route points as the one or more destination points.

12. An apparatus for processing a driving simulation scenario, the apparatus comprising:
a memory, configured to store executable instructions; and
at least one processor, configured to, when executing the executable instructions stored in the memory, cause the apparatus to:
acquire a plurality of route points in a road network model for driving simulation;
determine one or more departure points and one or more destination points from the plurality of route points;
acquire the one or more departure points in the road network model;
generate a test vehicle when the one or more departure points satisfy a test vehicle generation condition;
generate a background vehicle when the one or more departure points fail to satisfy the test vehicle generation condition but satisfy a background vehicle generation condition; and
control the background vehicle to travel in the road network model from the one or more departure points to a corresponding destination point of the one or more destination points, where the background vehicle is removed from the simulation scenario.

13. The apparatus according to claim 12, wherein the at least one processor, is further configured to, when executing the executable instructions stored in the memory, cause the apparatus to generate the test vehicle when the one or more departure points satisfy the test vehicle generation condition by performing steps, comprising:
traversing, when the one or more departure points comprise two or more departure points, the two or more departure points;
for a currently-traversed departure point included in the two or more departure points, traversing, when the currently-traversed departure point corresponds to two or more lanes, the two or more lanes; and
generating the test vehicle when the currently-traversed departure point corresponding to a currently-traversed lane reaches a test vehicle generation time and no other vehicle exists within a preset distance from the currently-traversed departure point.

14. The apparatus according to claim 12, wherein the at least one processor, is further configured to, when executing the executable instructions stored in the memory, cause the apparatus to generate the background vehicle when the one or more departure points fail to satisfy the test vehicle generation condition but satisfy the background vehicle generation condition by performing step, comprising:
generating the background vehicle when the one or more departure points fail to satisfy the test vehicle generation condition and reach a background vehicle generation time and no other vehicle exists within a preset distance,
wherein the background vehicle conforms to a preset dynamics model and the dynamics model corresponds to a preset vehicle type.

15. The apparatus according to claim 12, wherein the at least one processor is further configured to, when executing the executable instructions stored in the memory, cause the apparatus to:
acquire a traveling position and a traveling direction of the background vehicle; and
plan at least one of a traveling speed or a traveling route of the background vehicle when it is determined, based on the traveling position and the traveling direction, that the background vehicle travels to at least one of a route intersection position or a traffic signal light position.

16. The apparatus according to claim 12, wherein the at least one processor is further configured to, when executing the executable instructions stored in the memory, cause the apparatus to:
generate a test vehicle at the one or more departure points in the road network model; and
monitor a traveling plan made for the test vehicle based on a traveling policy in response to a traveling status of the background vehicle, the traveling plan comprising at least one of a route plan or a speed plan.

17. The apparatus according to claim 16, wherein the at least one processor, is further configured to, when executing the executable instructions stored in the memory, cause the apparatus to monitor the traveling plan made for the test vehicle based on the traveling policy in response to the traveling status of the background vehicle by performing steps, comprising:
acquiring a traveling parameter of the test vehicle corresponding to the traveling plan, wherein:
the traveling parameter comprises at least one of a speed parameter, a position parameter, or a direction parameter;
the traveling policy is used for acquiring the traveling status of the background vehicle; and
the traveling status comprises at least one of a traveling position, a traveling direction, or a traveling speed; and
performing the traveling plan on the test vehicle based on the traveling status.

18. A non-transitory storage medium storing executable instructions, the executable instructions, when executed by a processor, causing an electronic device to:
acquire a plurality of route points in a road network model for driving simulation;
determine one or more departure points and one or more destination points from the plurality of route points;
acquire the one or more departure points in the road network model;
generate a test vehicle when the one or more departure points satisfy a test vehicle generation condition;
generate a background vehicle when the one or more departure points fail to satisfy the test vehicle generation condition but satisfy a background vehicle generation condition; and
control the background vehicle to travel in the road network model from the one or more departure points to a corresponding destination point of the one or more destination points, where the background vehicle is removed from a simulation scenario.

19. The non-transitory storage medium of claim 18, wherein the executable instructions, when executed by a processor, further cause the electronic device to:
acquire a traveling position and a traveling direction of the background vehicle; and
plan at least one of a traveling speed or a traveling route of the background vehicle when it is determined, based on the traveling position and the traveling direction, that the background vehicle travels to at least one of a route intersection position or a traffic signal light position.

20. The non-transitory storage medium of claim 18, wherein the executable instructions, when executed by a processor, further cause the electronic device to:
monitor a traveling plan made for the test vehicle based on a traveling policy in response to a traveling status of the background vehicle, the traveling plan comprising at least one of a route plan or a speed plan.

* * * * *